(12) United States Patent
Fredlund et al.

(10) Patent No.: US 8,305,452 B2
(45) Date of Patent: Nov. 6, 2012

(54) REMOTE DETERMINATION OF IMAGE-ACQUISITION SETTINGS AND OPPORTUNITIES

(75) Inventors: John R. Fredlund, Rochester, NY (US); Bruce H. Pillman, Rochester, NY (US); Andrew C. Gallagher, Fairport, NY (US); Andrew C. Blose, Penfield, NY (US); John N. Border, Walworth, NY (US); Kevin M. Gobeyn, Rochester, NY (US); Richard B. Wheeler, Webster, NY (US); Michael J. Telek, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/151,304

(22) Filed: Jun. 2, 2011

(65) Prior Publication Data
US 2011/0228045 A1 Sep. 22, 2011

Related U.S. Application Data

(63) Continuation of application No. 11/961,497, filed on Dec. 20, 2007, now abandoned.

(51) Int. Cl.
*H04N 5/225* (2006.01)
*H04N 5/222* (2006.01)
*H04N 7/18* (2006.01)
*G08B 23/00* (2006.01)

(52) U.S. Cl. ............... 348/207.1; 348/333.02; 348/152; 340/523

(58) Field of Classification Search ............ 348/211.99–211.12, 207.1, 333.02, 231.99, 222.1–230.1, 348/207.11, 229.1, 208.14, 143, 144, 152–155; 340/500, 501, 515, 517, 522, 521, 523, 540; 725/105
See application file for complete search history.

(56) References Cited

U.S. PATENT DOCUMENTS

| | | | |
|---|---|---|---|
| 5,086,314 A | 2/1992 | Aoki et al. | |
| 6,301,440 B1 * | 10/2001 | Bolle et al. | 396/128 |
| 6,956,477 B2 * | 10/2005 | Chun | 340/541 |
| 2002/0034384 A1 | 3/2002 | Mikhail | |
| 2003/0007076 A1 | 1/2003 | Okisu et al. | |
| 2004/0004663 A1 | 1/2004 | Kahn et al. | |
| 2005/0122405 A1 | 6/2005 | Voss et al. | |
| 2005/0172147 A1 | 8/2005 | Edwards et al. | |
| 2005/0221841 A1 | 10/2005 | Piccionelli et al. | |
| 2005/0275726 A1 | 12/2005 | Abraham et al. | |
| 2006/0153469 A1 | 7/2006 | Gallagher | |
| 2007/0025722 A1 * | 2/2007 | Matsugu et al. | 396/263 |
| 2007/0030363 A1 * | 2/2007 | Cheatle et al. | 348/239 |
| 2007/0255456 A1 | 11/2007 | Funayama | |
| 2007/0282908 A1 * | 12/2007 | Van der Meulen et al. | 707/104.1 |

FOREIGN PATENT DOCUMENTS

| | | | |
|---|---|---|---|
| GB | 2 403 365 | | 12/2004 |
| JP | 2002185846 | * | 6/2002 |
| JP | 2002185846 A | | 6/2002 |
| JP | 2004064385 A | | 2/2004 |
| JP | 2004120277 A | | 4/2004 |
| JP | 2004120277 A | * | 4/2004 |
| JP | 2007282017 A | * | 10/2007 |
| JP | 2007282017 A | | 10/2007 |

* cited by examiner

*Primary Examiner* — Jason Whipkey
*Assistant Examiner* — Marly Camargo
(74) *Attorney, Agent, or Firm* — Raymond L. Owens

(57) ABSTRACT

Pre-image-acquisition information is obtained by a digital camera and transmitted to a system external to the digital camera. The system is configured to provide image-acquisition settings to the digital camera. In this regard, the digital camera receives the image-acquisition settings from the external system and performs an image-acquisition sequence based at least upon the received image-acquisition settings. Accordingly, the determination of image-acquisition settings can be performed remotely from the digital camera, where data-processing resources can greatly exceed those within the digital camera.

4 Claims, 6 Drawing Sheets

REMOTE DETERMINATION OF IMAGE-ACQUISITION SETTINGS AND OPPORTUNITIES

CROSS REFERENCE TO RELATED APPLICATION

This application is a continuation of commonly assigned U.S. application Ser. No. 11/961,497 filed Dec. 20, 2007 now abandoned (U.S. Patent Application Publication No. 2009-0160970), entitled "Remote Determination of Image-Acquisition Settings and Opportunities" by John R. Fredlund et al, the disclosure of which is incorporated herein.

FIELD OF THE INVENTION

This invention relates to remote determination of image-acquisition settings and opportunities for a digital camera based at least upon pre-image-acquisition information obtained by the digital camera.

BACKGROUND

Many parameters affect the quality and usefulness of an image of a scene acquired by a camera. For example, parameters configured to control exposure time affect motion blur, parameters configured to control f/number affect depth-of-field, and so forth. In many cameras, all or some of these parameters can be controlled and are conveniently referred to herein as image-acquisition settings.

Methods for controlling exposure and focus parameters are well known in both film-based and electronic cameras. However, the level of intelligence in these systems is limited by resource and time constraints in the camera. In many cases, knowing the type of scene being acquired can lead easily to improved selection of image-acquisition parameters. For example, knowing a scene is a portrait allows the camera to select a wider aperture to minimize depth-of-field. Knowing a scene is a sports/action scene allows the camera to automatically limit exposure time to control motion blur and adjust gain (exposure index) and aperture accordingly. Knowing the scene is a sunset suggests that the color balance will be shifted from the norm and that high saturation is likely to be desired. Knowing a scene is a snow scene indicates that a special mapping of input brightness to output values is desired. Because this knowledge is useful in guiding simple exposure control systems, many film, video, and digital still cameras include a number of scene modes that can be selected by the user. These scene modes are essentially collections of image-acquisition settings, which direct the camera to optimize parameters given the user's selection of scene type.

The use of scene modes is limited in several ways. One limitation is that the user must select a scene mode for it to be effective, which is often inconvenient, and shifts the burden of scene determination from the image-acquisition device to the user. The average user generally understands little of the utility and usage of the scene modes.

A second limitation is that scene modes tend to oversimplify the possible kinds of scenes being acquired. For example, a common scene mode is "portrait", which is optimized for capturing images of people. Another common scene mode is "snow", which is optimized to acquire a subject against a background of snow with different parameters. If a user wishes to acquire a portrait against a snowy background, the user must choose either portrait or snow, but the user cannot combine aspects of each. Many other combinations exist, and creating scene modes for the varying combinations is cumbersome at best. In another example, a backlit scene can be very much like a scene with a snowy background, in that subject matter is surrounded by background with a higher brightness. Few users are likely to understand the concept of a backlit scene and realize it has crucial similarity to a "snow" scene. A camera developer wishing to help users with backlit scenes will probably have to add a scene mode for backlit scenes, even though it may be identical to the snow scene mode.

Both of these scenarios illustrate the problems of describing photographic scenes in way accessible to a casual user. The number of scene modes required expands greatly and becomes difficult to navigate. The proliferation of scene modes ends up exacerbating the problem that many users find scene modes excessively complex.

Attempts to automate the selection of a scene mode have been made, for example, in United States Patent Application Publication No. 2003/0007076 by Noriyuki Okisu et al. and U.S. Pat. No. 6,301,440, to Rudolf M. Bolle et al. A limitation on such automated methods is that they tend to be computationally intensive relative to the simpler methods. In this regard, cameras tend to be relatively limited in computing resources, in order to reduce cost, cut energy drain, and the like. Consequently, a noticeable lag between shutter trip and image acquisition occurs in some cameras. Such lag is highly undesirable when a subject to be photographed is in motion. One solution to the problem of lag is avoidance of highly time consuming computations, which leads us back again to the also-undesirable use of fewer, manually selected modes with associated image-acquisition settings.

Accordingly, a need in the art exists for improved solutions for determining image-acquisition settings in a computationally-sensitive environment.

SUMMARY

The above-described problems are addressed and a technical solution is achieved in the art by systems and methods for identifying image-acquisition settings, according to various embodiments of the present invention. In an embodiment of the present invention, pre-image-acquisition information is obtained by a digital camera and transmitted to a system external to the digital camera. Such an external system is referred to herein as an "image-acquisition-setting providing system", or an "IAS Providing System," and is configured to provide image-acquisition settings to the digital camera. In this regard, the digital camera receives the image-acquisition settings from the IAS Providing System in response to the step of transmitting the pre-image-acquisition information. Subsequently, the digital camera performs an image-acquisition sequence based at least upon the received image-acquisition settings.

Accordingly, embodiments of the present invention allow the determination of image-acquisition settings to be performed remotely from the digital camera, where data-processing resources and available data sources can greatly exceed those within the digital camera. In this regard, the remote system need not be limited to a select group of "scene modes" and can identify image-acquisition settings customized for the particular pre-image-acquisition information provided by the digital camera.

Examples of pre-image-acquisition information may include audio information, illumination information, camera position information, camera orientation information, motion information, an announcement of the digital camera's presence, temperature information, humidity information, ceiling detection information, distance-to-subject information, spectral information, etc. In this regard, some or all of the pre-image acquisition information may be generated, at least in part, by the digital camera itself or by a system external to the digital camera, such as a global positioning system ("GPS"), known in the art.

In some embodiments, the digital camera may determine whether or not it is appropriate to acquire an image based at least upon an analysis of the received image-acquisition settings. For example, the received image-acquisition settings may require the digital camera to operate in a manner that it deems will produce an unacceptable image. Consequently, the digital camera may present an indication configured to warn a user of the digital camera that performing the image-acquisition sequence is not appropriate or to advise the user to take an action to improve the appropriateness of performing the image-acquisition sequence.

In some embodiments, the IAS Providing System can include in its image-acquisition settings an indication of whether the digital camera is even permitted to acquire images. These embodiments allow, for example, an event operator to prevent images of the event from being acquired.

According to some embodiments of the present invention, the digital camera generates image data from the image-acquisition sequence and transmits at least the image data and the pre-image-acquisition information to an image processing system external to the digital camera for processing. The image processing system may or may not be the same system as the IAS Providing System. In some embodiments, the digital camera may obtain image-acquisition information (as opposed to pre-image-acquisition information) contemporaneously with the image-acquisition sequence. In this regard, the digital camera may transmit the pre-image-acquisition information, the image-acquisition information, and the image data to the image processing system for processing.

Examples of image-acquisition information includes audio information, illumination information, camera position information, camera orientation information, motion information, temperature information, humidity information, ceiling detection information, distance to subject information, spectral information such as histograms, etc. In this regard, in some embodiments, information in the image-acquisition information and the pre-image-acquisition information is of a same category. For example, both the pre-image acquisition information and the image-acquisition information may include illumination information. In some of these embodiments, the digital camera may be configured to verify the consistency between the information of the same category. For example, the digital camera may be configured to verify that illumination conditions have not substantially changed from the time the pre-image-acquisition information was obtained and the time the image-acquisition information was obtained. If a meaningful difference did occur, the user may be notified, corrective image processing may occur, or both. In the embodiments where the image data is transmitted to an external image processing system, the external image processing system may not only perform the corrective image processing, but also may perform the verification of consistency between pre-image-acquisition and image-acquisition information.

According to some embodiments of the present invention, pre-image acquisition information includes a present time. The pre-image acquisition information may be transmitted to a system external to the digital camera. In response, the digital camera may receive image-opportunity information from the system, where such information is configured to guide a user of the digital camera towards an image-acquisition opportunity. The image-opportunity information indicates at least a time period in which the image-acquisition opportunity exists. The digital camera may present the image-opportunity information in a manner configured to present the image-opportunity information, or a derivative thereof, to a user of the digital camera. Accordingly, users can become informed of image-acquisition opportunities currently available nearby.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

Embodiments of the present invention allow the determination of image-acquisition settings to be performed remotely from the digital camera, where data-processing resources can greatly exceed those within the digital camera. In this regard, the remote system need not be limited to a select group of "scene modes" and can identify image-acquisition settings customized for the particular pre-image-acquisition information provided by the digital camera. Consequently, better-tailored image-acquisition settings can be generated, and generated more quickly, than conventional techniques.

It should be noted that the phrase "image-acquisition" is intended to refer to the process of acquiring an image performed by a camera. In this regard, "image-acquisition" is to be differentiated from processes that occur down-stream from image-acquisition, such as processes that pertain to determining what to do with already-acquired images. It should also be noted that, unless otherwise explicitly noted or required by context, the word "or" is used in this disclosure in a non-exclusive sense.

Figure 1:
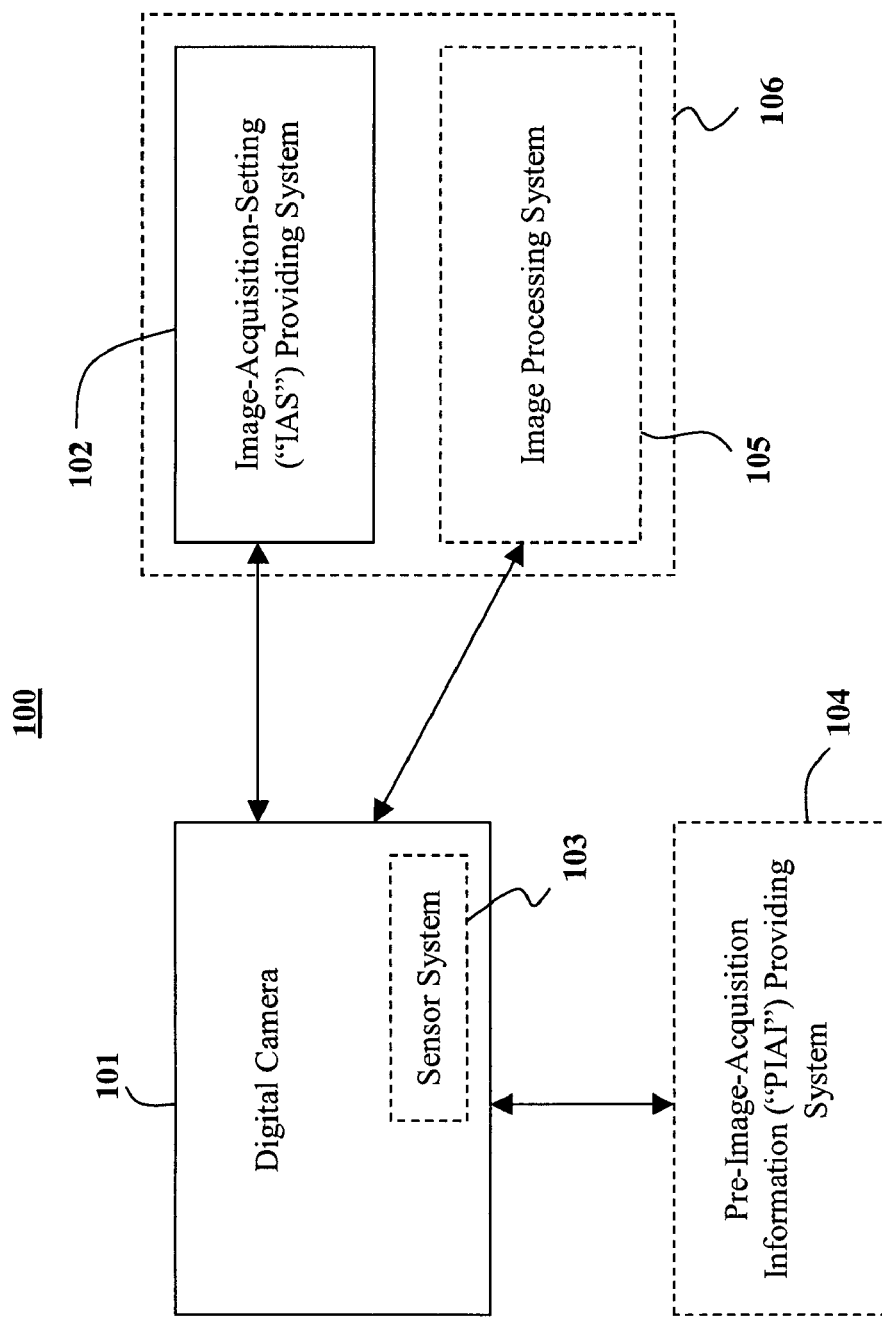
FIG. 1 illustrates a system for identifying image-acquisition settings, according to an embodiment of the present invention.

FIG. 1 illustrates a system 100 for identifying image-acquisition settings, according to an embodiment of the present invention. The system 100 includes a digital camera 101, an image-acquisition-setting ("IAS") providing system 102, an optional pre-image-acquisition information ("PIAI") providing system 104, and an optional image processing system 105. The term "system" is intended to include one or more devices configured to collectively perform a set of one or more functions. In this regard, the broken line 106 indicates that the IAS providing system 102 and the image processing system 105 may be part of a same system or a common device. Further in this regard, although not shown in FIG. 1, the PIAI providing system 104 also may be part of a common system or a common device with the image processing system 105 or IAS providing system 102.

The IAS providing system 102, the PIAI providing system 104, and the image processing system 105 are communicatively connected to the digital camera 101. The phrase "communicatively connected" is intended to include any type of connection between devices, whether wired or wireless, in which data may be communicated.

The digital camera 101 is configured to implement the processes of the various embodiments of the present invention, including the example processes of FIGS. 2-5 described herein. Although not shown in FIG. 1, the digital camera includes a data processing system including one or more data processing devices and a processor-accessible memory system that facilitate implementation of the processes of the various embodiments of the present invention, including the example processes of FIGS. 2-5 described herein. The processor-accessible memory system includes one or more processor-accessible memories configured to store information, including the information needed to execute the processes of the various embodiments of the present invention, including the example processes of FIGS. 2-5 described herein. The phrase "processor-accessible memory" is intended to include any processor-accessible data storage device, whether volatile or nonvolatile, electronic, magnetic, optical, or otherwise, including but not limited to, RAM, ROM, hard disks, and flash memories.

The digital camera 101 also includes an optional sensor system 103 configured to obtain pre-image-acquisition information or image-acquisition information. In this regard, the sensor system 103 may include sensors, known in the art, for obtaining audio information, illumination information, camera position information, camera orientation information, motion information, an announcement of the digital camera's presence, temperature information, humidity information, ceiling detection information, distance to subject information, spectral information such as histograms, etc. Alternatively or in addition, pre-image-acquisition information may be obtained by devices within the PIAI providing system 104 and transmitted to the digital camera 101. Although FIG. 1 shows the system 104 as providing pre-image-acquisition information, one skilled in the art will appreciate that the system 104 may provide image-acquisition information in addition to or in lieu of the pre-image-acquisition information.

Figure 2:
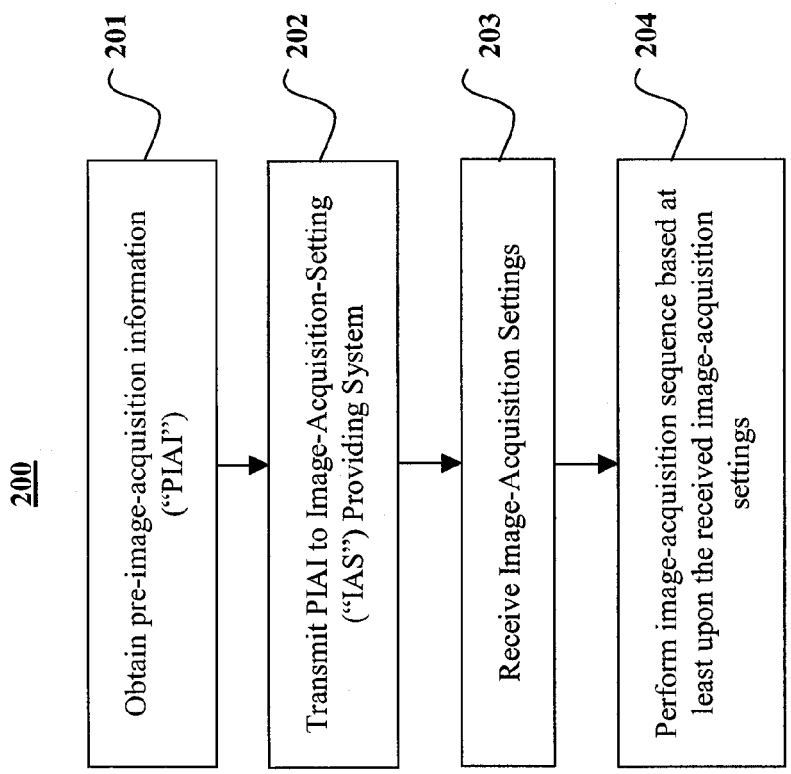
FIG. 2 illustrates a method for identifying image-acquisition settings, according to an embodiment of the present invention.

FIG. 2 illustrates a method 200 implemented by the digital camera 101 for identifying image-acquisition settings, according to an embodiment of the present invention. At step 201, the digital camera obtains pre-image-acquisition information ("PIAI"). The PIAI may include, for example, audio information, illumination information, camera position information, camera orientation information, motion information, an announcement of the digital camera's presence, temperature information, humidity information, ceiling detection information, distance to subject information, or spectral information such as histograms. The PIAI may be obtained via the sensor system 103 or from one or more external devices within the PIAI providing system 104.

At step 202 the digital camera 101 transmits the PIAI to the image-acquisition-setting ("IAS") providing system 102. The IAS providing system 102 may include one or more data processing devices, another camera, a server, etc. In this regard, the IAS providing system 102 may include superior computing power than that included within the digital camera 101. Consequently, with the PIAI, the IAS providing system 102 determines appropriate image-acquisition settings for the digital camera 101 in order to improve the quality of an image about to be acquired by the digital camera 101. The IAS providing system 102 transmits these image-acquisition settings to the digital camera and, consequently, at step 203, the digital camera 101 receives the image-acquisition settings from the IAS providing system 102.

For example, the PIAI may include a measure of the dynamic range of a scene. A daylight scene containing brightly lit portions and dark shadows, such as a scene of a field of Holsteins viewed from under a copse of Ginko trees with dense foliage, may have a dynamic range that is greater than the camera's image acquisition system is capable of acquiring. A measurement of dynamic range, whether acquired by multiple pre-image-acquisitions by the image acquisition system, or by a sensor designed to measure dynamic range, may be provided as PIAI to the IAS providing system 102. The IAS providing system 102 uses this measurement information to determine that multiple image-acquisitions are required to render the scene as best as possible, and also to determine the optimum exposures for each of the image-acquisitions. These image-acquisition settings are sent to the digital camera 101.

At step 204, the digital camera 101 performs an image-acquisition sequence based at least upon the received image-acquisition settings. In view of the high-bandwidth and quick data transmission times currently available, and the improvements to bandwidth and data transmission times that will become available, the IAS providing system 102 can quickly provide accurate image-acquisition settings for the digital camera 101 without the need for excessive data processing capabilities on the digital camera 101 itself.

It should be noted that, in some embodiments of the present invention, the image-acquisition settings include a triggering signal that, when received by the digital camera 101, instructs the digital camera 101 to initiate the image-acquisition sequence at step 204. Such a feature may be useful, for instance, when precise timing for image acquisition is needed. For example, at a racing event, the IAS providing system 102 can be configured to provide a triggering signal in the image-acquisition settings when a leading racecar approaches the finish line, thereby allowing respective digital cameras to acquire an image of the racecar crossing the finish line at precisely the right moment. Or, at an amusement park, for example, the IAS providing system can be configured to provide a triggering signal when a particular amusement ride car enters a digital camera's field of view.

Figure 3:
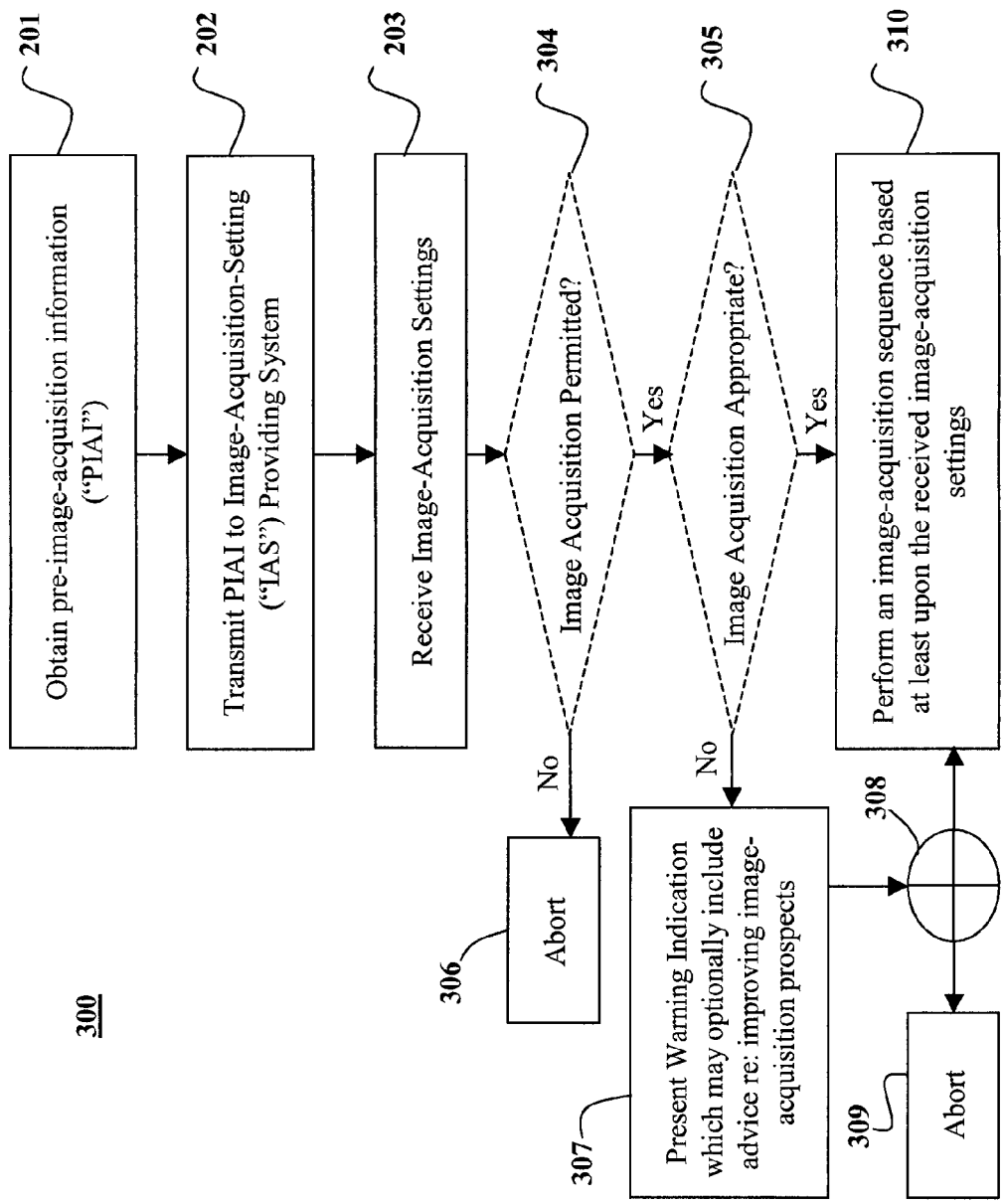
FIG. 3 illustrates an alternative method for identifying image-acquisition settings, according to an embodiment of the present invention.

FIG. 3 illustrates a method 300 for identifying image-acquisition settings, according to an embodiment of the present invention. The method 300 begins with the same steps 201-203 initially discussed with respect to FIG. 2. The method 300 differs, however, in that it includes optional steps 304 and 305. In particular, after receipt of the image-acquisition settings 203, the digital camera 101 can determine at step 304 whether image-acquisition is permitted. To elaborate, the image-acquisition settings may include an indication of whether or not the digital camera 101 is even allowed to acquire an image. For example, the pre-image-acquisition information obtained by the digital camera 101 may include an announcement of the camera's presence or an indication of the camera's location. The IAS providing system 102 may use this information to determine that the digital camera 101, based upon its identification or its location, for example, is not allowed to acquire images. Alternately, the IAS providing system 102 may use this information to determine that the digital camera 101, based upon its location and orientation direction, for example, is not allowed to acquire images in some directions, and is only allowed to acquire images in other directions. In some embodiments, the pre-image-acquisition information obtained by the digital camera 101 may include image content from a preliminary image acquisition. The IAS providing system 102 may use the image content to determine whether or not the digital camera 101 is allowed to acquire images. For example, the IAS providing system 102 may consider in its determination the color content, textures, line direction, the number of faces detected, whether particular faces are detected, face location, the number of objects detected, whether particular objects are detected, or object location in the image content. The above-features may be useful, for example, by event organizers. The event organizers may, consequently, have the ability to prevent images of the event from being acquired by particular cameras or any camera. In this regard, at step 304, if image acquisition is not permitted, the method 300 may abort at step 306. Otherwise, processing may proceed onto step 305, if this step is implemented, or directly to step 310 where an image-acquisition sequence is performed.

If step 305 is performed, the digital camera 101 may determine, based at least upon the received image acquisition settings, that image acquisition is or is not appropriate. In this regard, the IAS providing system 102 may provide image acquisition settings that the digital camera 101 deems will produce an unacceptable image. In this case, the digital camera 101 may determine that image acquisition is not appropriate at step 305, and may present a warning indication to a user. In this regard, the digital camera 101 may also present advice to the user regarding how the user can improve the image acquisition prospects at step 307. Note that the advice presented to the user may be received with the Image-Acquisition Settings in step 203. For example, when the user is attempting to acquire a photograph of the moon rising over the trees on the far side of an Adirondack lake, advice to the user, whether determined by the digital camera 101 or by IAS providing system 102, may be to instruct the user to immobilize digital camera 101 so that a long exposure or multiple exposures could be taken to acquire the silhouettes of the trees and the reflection of the moon off the water. In the case of multiple exposures, the images can be combined in digital camera 101 or in Image Processing System 105. In an embodiment, the Image-Acquisition-Setting Providing system 102 uses the PIAI, including location, direction, distance-to-subject, and average illumination, and other non-PIAI information, such as weather information and moonrise information, to determine that the likely subject is a moonrise and incorporates the immobilization warning along with the Image-Acquisition Settings in step 203.

After presenting the indication and optional advice at step 307, the digital camera 101 may either 308 abort the performance of an image-acquisition sequence at step 309 or perform an image-acquisition sequence based at least upon the received image acquisition settings at step 310. The decision whether to abort at step 309 or perform the image acquisition sequence at step 310 may be determined at least by user input.

Figure 4:
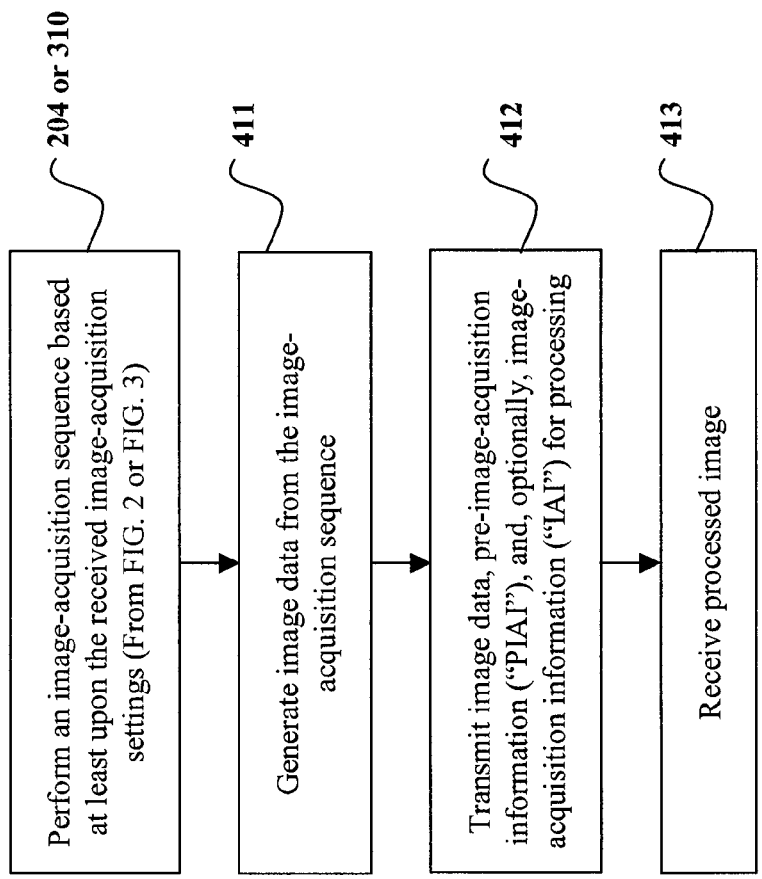
FIG. 4 illustrates a method for identifying image-acquisition settings and processing image data acquired based at least upon the identified image-acquisition settings, according to an embodiment of the present invention.

FIG. 4 illustrates a method 400 for identifying image-acquisition settings and processing image data acquired based at least upon the identified image-acquisition settings, according to an embodiment of the present invention. The method 400 is a continuation of the processes of FIG. 2 or 3. Consequently, the method 400 begins with step 204 in FIG. 2 or step 310 in FIG. 3 where an image-acquisition sequence is performed. At step 411, the digital camera 101 generates image data from the performed image-acquisition sequence. In this regard, the image-acquisition sequence may include the acquisition of multiple images, where the multiple images are configured to be synthesized into a single image, a collage, or a video. Regardless, the resulting image data from the image-acquisition sequence, as well as the pre-image-acquisition information may be transmitted to the image processing system 105. This transmission occurs at step 412 and also may optionally include image-acquisition information ("IAI"). The IAI may include the same information as the PIAI, but be obtained at different points in time. For example, the PIAI is obtained before image acquisition and the IAI is obtained contemporaneously or substantially contemporaneously with image acquisition.

The information transmitted at step 412 is used by the image processing system 105 to process the image data. The aforementioned moon picture is one example that can benefit from processing in image-processing system 105. Using PIAI, including, e.g., location, direction, distance-to-subject, and average illumination, and IAI, such as detected camera movement, processing system 105 can integrate the knowledge of these parameters into processing the acquired images to provide an improved composite image that does not unduly compress the range of either the moon or the silhouettes of the trees and the reflections from the water. Another example is an image-acquisition looking over Spectacle Lake from the top of Good Luck Mountain on a hazy summer midday. Using PIAI, including, e.g., location, direction, distance to subject and average illumination and IAI such as humidity, processing system 105 can integrate the knowledge of these parameters along with weather information into processing the acquired image to provide an improved processed image by expanding the dynamic range of the acquired image.

Although not shown in FIG. 4, either the digital camera 101 or the image processing system 105 may check for consistency between the PIAI and the IAI. If there are inconsistencies between the PIAI and the IAI, the image processing system 105 may process the image data differently than if the PIAI and the IAI were consistent. An image-acquisition taken through the window of a moving automobile is an example. PIAI location information, in this case, will be significantly different than IAI location information. Assuming accurate location information in both PIAI and IAI information, processing system 105 can determine that there is motion associated with the image-acquisition. This motion is detected apart from or in addition to IAI information on camera shake that is determined from small accelerations that are the result of user movements. Additionally, direction and velocity can be determined from the differing locations. These factors can be figured into processing the acquired image and motion blur can be minimized. After processing of the image by the image processing system 105, the digital camera 101 receives the processed image at step 413.

Figure 5:
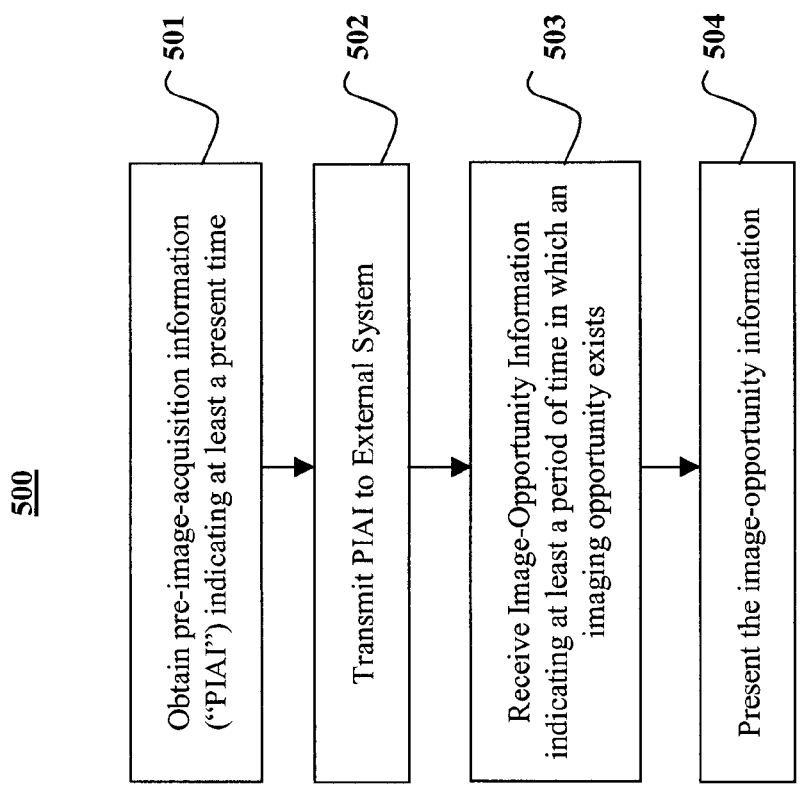
FIG. 5 illustrates a method for identifying an image-acquisition opportunity, according to embodiments of the present invention.

FIG. 5 illustrates a method 500 for identifying an image-acquisition opportunity, according to an embodiment of the present invention. The embodiment of FIG. 5 begins at step 501 where the digital camera 101 obtains PIAI indicating at least a present time. The PIAI is transmitted to an external system at step 502, such external system being configured at least to determine whether or not an improved image-acquisition opportunity exists for the digital camera 101. For example, if the PIAI includes camera orientation information and camera location information, as well as a present time, the external system may determine that a popular imaging opportunity is available to the digital camera 101 nearby and within a current or upcoming span of time. The external system may be the IAS providing system 102, and the image-opportunity information may be provided with or within the image-acquisition settings provided to the digital camera 101.

Figure 6:
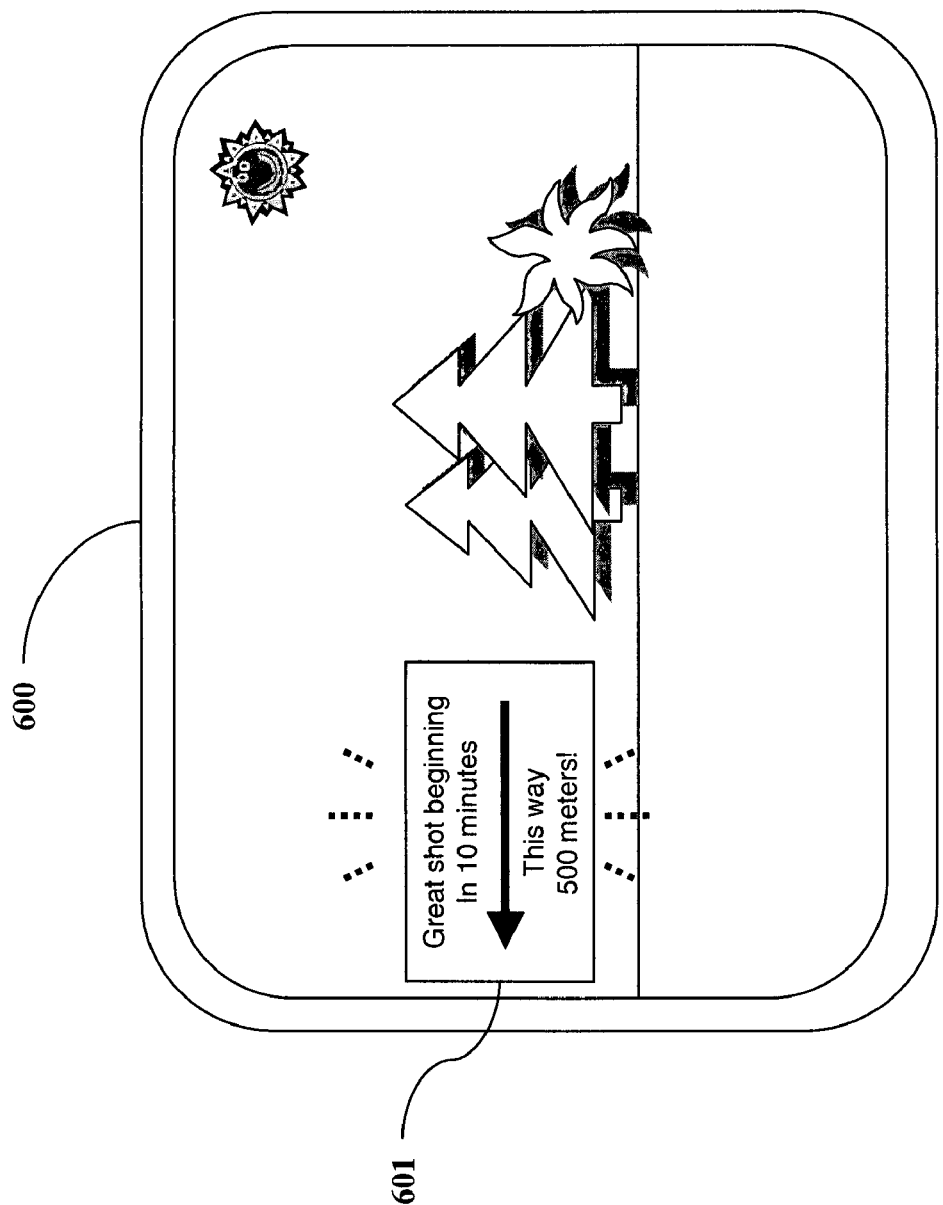
FIG. 6 illustrates the presentation of an indication of an image-acquisition opportunity, according to an embodiment of the present invention.

FIG. 6 illustrates an example 600 of image-opportunity information presented by the digital camera 101 to a user. The image-opportunity information, in this example, indicates a period of time in which an imaging opportunity exists or a moment in time in which the imaging opportunity exists, as shown at reference numeral 601. In this regard, FIG. 6 illustrates an embodiment of step 504 where the image-opportunity information is presented to the user.

It is to be understood that the exemplary embodiments are merely illustrative of the present invention and that many variations of the above-described embodiments can be devised by one skilled in the art without departing from the scope of the invention.

For example, although often described with the view that an IAS providing system provides all image acquisition settings to a digital camera, one skilled in the art will appreciate that the invention is not so limited. For instance, the IAS providing system may provide only some image acquisition settings, while the digital camera provides others. Or, the IAS providing system may provide image acquisition settings redundant to those provided by the digital camera itself, for purposes of verification or improvement of the image acquisition settings provided by the digital camera. Or, still, the digital camera may receive image acquisition settings from the IAS providing system and process them or modify them before arriving at a final set of image acquisition settings ultimately used in an image-acquisition sequence. By processing or otherwise modifying the received image acquisition settings, it can be said that the image-acquisition sequence is performed based at least upon a derivative of the received image acquisition settings, because the received image-acquisition settings have been processed or modified in some manner.

For another example, although step 304 in FIG. 3 is described in the context of a digital camera using image-acquisition settings to determine whether image-acquisition is permitted, one skilled in the art will appreciate that the invention is not so limited. For instance, image-acquisition settings received by a digital camera may include additional information that pertains to image-acquisition permissions, such as what metadata or the amount of detail in metadata that is recorded by a digital camera along with an image-acquisition sequence. In one instance, and IAS providing system may be configured to provide image acquisition settings that prevent digital cameras within a particular location from recording their location in metadata when performing an image-acquisition sequence.

For yet another example, although this disclosure describes that received image acquisition settings may be used to perform an image acquisition sequence involving multiple image acquisitions, one skilled in the art will appreciate that the invention is not so limited. For instance, an IAS providing system may provide multiple sets of image acquisition settings to a digital camera, each of the multiple sets of image acquisition settings being configured to control a subset of the multiple image acquisitions in the image acquisition sequence. In one case, each set of image acquisition settings may be configured to control one of the multiple image acquisitions in the image acquisition sequence.

For still yet another example, step 304 in FIG. 3 is described in the context of determining whether the digital camera 101 is permitted to acquire an image. Such determination may be made based at least upon digital camera location, digital camera orientation, or image content included in pre-image acquisition information. However, one skilled in the art will appreciate that the digital camera location, digital camera orientation, or image content in the pre-image acquisition information need not only be used to determine whether or not a digital camera is permitted to acquire an image, but also may be used to allow a digital camera to acquire an image while limiting how that image is acquired. To elaborate, the image-acquisition settings provided by the IAS providing system 102 at step 203 may be used to limit how an image is acquired. For instance, the IAS providing system 102 may limit the digital camera 101 to using at least (a) a particular image-acquisition mode or parameter or (b) one of a particular set of image-acquisition modes or parameters, such as a focus distance, camera operating mode, flash mode, still or video mode, panorama or non-panorama mode, etc. These features may be useful, for example, for allowing an image to be acquired while preventing (a) a particular use of the digital camera or (b) a particular object from being represented in the image. For example, the IAS providing system 102 can allow image-acquisitions at an event, but prevent flashes from being used. For another example, assume that an owner of a building wants to prevent images of the building from being acquired. The IAS providing system 102 can allow images to be acquired in the vicinity of the building, but require a short focus distance. The short focus distance would allow close-up portrait images of people standing in front of the building to be acquired, but would cause the building in the background of such images to be blurry.

It is therefore intended that all such variations be included within the scope of the following claims and their equivalents.

PARTS LIST

100 System
101 Digital camera
102 IAS providing system
103 Sensor system
104 PIAI providing system
105 Image processing system
106 Broken line
200 Method
201 Step
202 Step
203 Step
204 Step
300 Method
304 Step
305 Step
306 Step
307 Step
308 Or symbol
309 Step
310 Step
400
411 Step
412 Step
413 Step
500 Method
501 Step
502 Step
503 Step
504 Step
600 Example
601 Moment in time

The invention claimed is:

1. A method implemented by a digital camera for determining image acquisition settings and acquiring an image, the method comprising:

obtaining with the digital camera and one or more associated sensors, pre-image-acquisition information prior to an image acquisition comprising audio information, and at least one of: illumination information, camera position information, camera orientation information, motion information, an announcement of the digital camera's presence, temperature information, humidity information, ceiling detection information, distance to subject information, spectral information including histograms, a measure of the dynamic range of a scene, or present time;

transmitting only the pre-image-acquisition information to an image-acquisition-setting providing system that is external to the digital camera;

the digital camera receiving from the system a determination of image acquisition settings based on only the pre-image-acquisition information; and the digital camera performing the image acquisition based upon the received image acquisition settings.

2. The method of claim 1, wherein the image acquisition involves multiple image acquisitions, and wherein the multiple images are configured to be synthesized into a single image, a collage, or a video.

3. The method of claim 1, wherein the image acquisition involves multiple image acquisitions, and wherein the received image acquisition settings include different image acquisition settings for different ones of the multiple image acquisitions.

4. The method of claim 1, further including the system receiving and using information external from the digital camera to provide image acquisition settings.

* * * * *